United States Patent
Nakajima (10) Patent No.: US 9,321,124 B2
(45) Date of Patent: Apr. 26, 2016

(54) SPOT WELDING ELECTRODE HOUSING APPARATUS

(71) Applicant: Kyokutoh Co., Ltd., Aichi (JP)

(72) Inventor: Kotaro Nakajima, Aichi (JP)

(73) Assignee: Kyokutoh Co., Ltd., Aichi (JP)

( * ) Notice: Subject to any disclaimer, the term of this patent is extended or adjusted under 35 U.S.C. 154(b) by 0 days.

(21) Appl. No.: 14/519,523

(22) Filed: Oct. 21, 2014

(65) Prior Publication Data

US 2015/0298246 A1    Oct. 22, 2015

Related U.S. Application Data

(63) Continuation of application No. PCT/JP2014/002196, filed on Apr. 17, 2014.

(51) Int. Cl.
*B23K 11/31* (2006.01)
*B23K 11/30* (2006.01)
(Continued)

(52) U.S. Cl.
CPC ............. *B23K 11/312* (2013.01); *B23K 11/115* (2013.01); *B23K 11/3072* (2013.01); *B23K 11/36* (2013.01); *B23K 2201/006* (2013.01); *B23Q 3/15526* (2013.01); *Y10T 483/13* (2015.01); *Y10T 483/17* (2015.01); *Y10T 483/1882* (2015.01)

(58) Field of Classification Search
CPC ............................ B23K 11/3072; B23K 11/312
USPC ........................................................ 483/7–11
See application file for complete search history.

(56) References Cited

U.S. PATENT DOCUMENTS 5,387,774 A   2/1995  Boyer et al.
5,791,032 A * 8/1998  Spencer ............... B23Q 1/0009
                                              29/39

(Continued)

FOREIGN PATENT DOCUMENTS

EP    2 072 170 A1    6/2009
JP    03-184673       8/1991
JP    07-67628 B      7/1995
(Continued)

OTHER PUBLICATIONS

International Search Report for corresponding International Application No. PCT/JP2014/002196 mailed Jul. 22, 2014.
(Continued)

*Primary Examiner* — Tu B Hoang
*Assistant Examiner* — Erin McGrath
(74) *Attorney, Agent, or Firm* — Renner, Otto, Boisselle & Sklar, LLP (57) ABSTRACT

Provided is a spot welding electrode housing apparatus having a reduced size such that an operation of mounting electrodes on a welding gun is less likely to affect a line takt time. Specifically, a rotation regulator positioned adjacent to a rotating plate in a direction of a rotation axis is configured to allow the rotating plate to abut against an electrode housed and held in a first recess or a second recess and thereby to regulate a rotation of the rotating plate toward one direction around the rotation axis when the rotating plate rotationally biased by a spiral spring toward the one direction around the rotation axis is allowed to rotate toward the other direction around the rotation axis against a biasing force of the spiral spring.

5 Claims, 6 Drawing Sheets (51) Int. Cl.
*B23K 11/11* (2006.01)
*B23K 11/36* (2006.01)
*B23Q 3/155* (2006.01)

(56) References Cited

U.S. PATENT DOCUMENTS

2005/0023250 A1  2/2005  Izumi et al.
2009/0101628 A1* 4/2009  Kaeseler ............ B23K 11/3072
                                                    219/86.8

FOREIGN PATENT DOCUMENTS

| JP | 2002-079381 | 3/2002 |
| JP | 2005-046888 | 2/2005 |
| JP | 2010-172913 | 8/2010 |
| JP | 2013-059782 | 4/2013 |

OTHER PUBLICATIONS

Form PCT/ISA/237 for corresponding International Application No. PCT/JP2014/002196 dated Jul. 22, 2014.

* cited by examiner

SPOT WELDING ELECTRODE HOUSING APPARATUS

CROSS-REFERENCE TO RELATED APPLICATIONS

This is a continuation of International Application No. PCT/JP2014/002196 filed on Apr. 17, 2014. The entire disclosure of the application is incorporated by reference herein.

BACKGROUND

The present disclosure relates to spot welding electrode housing apparatuses where an electrode for spot welding in, for example, automobile production lines is housed so as to be mountable to a shank end of a welding gun.

Conventionally, in automobile production lines, plural press molded products are joined by spot welding to assemble a vehicle body, and the spot welding is performed using a welding gun held by an industrial robot.

An electrode mounted on a shank end of a welding gun is worn out due to repeating spot welding, and therefore, the electrode has to be periodically exchanged for another one. Therefore, in an exchange of an electrode for another one, in order to efficiently mount the electrode on a welding gun, for example, a spot welding electrode housing apparatus as disclosed in Japanese Unexamined Patent Publication No. 2010-172913 is installed in an automobile production line.

The spot welding electrode housing apparatus includes a disk-shaped rotating plate having a vertical rotation axis, and the outer circumferential surface of the rotating plate is provided with a plurality of outwardly protruding portions in the circumferential direction. In the rotating plate, a plurality of first upwardly opening recesses and second downwardly opening recesses are provided around the rotation axis, and electrodes are inserted into the first and second recesses from the respective end sides of the electrodes, thereby housing and holding the electrodes. A sliding plate which is tangentially slidable relative to the rotating plate is provided outside the rotating plate. A pair of the electrodes inserted and held at a corresponding pair of the first and second recesses at a mount position of electrodes are mounted on a shank end of a welding gun, and after the electrodes are taken out of the recesses, the sliding plate is pushed toward one direction by the shank end of the welding gun to catch a step lever, attached to the sliding plate, on one of the protruding portions, whereby the rotating plate is rotated until another pair of the first and second recesses adjacent to the first and second recesses out of which the electrodes have been taken are at the mount position of electrodes to allow another pair of the electrodes to be in the standby state for mounting.

SUMMARY

However, in the spot welding electrode housing apparatus shown in Japanese Unexamined Patent Publication No. 2010-172913, a sliding mechanism for sliding the rotating plate is provided outside the rotating plate, and therefore, the size of equipment is increased around a rotation axis, and if such an apparatus is installed in an automobile production line, the apparatus may occupy a large space.

The apparatus is not in a standby state for mounting the electrodes unless, after the electrodes mounted on the shank ends are taken out of the first and second recesses, the welding gun moves to a position for pushing the sliding plate, and then, the welding gun pushes the sliding plate. Therefore, the welding gun cannot perform welding immediately after mounting the electrode thereon, posing problems with a line takt time.

The present disclosure has been developed in view of the problems, and it is an object of the present disclosure to provide a spot welding electrode housing apparatus having a reduced size such that an operation of mounting the electrodes on the welding gun is less likely to affect a line takt time.

In order to attain the above object, the present disclosure is characterized by positioning, inside a rotor, a biasing member allowing a rotor to rotate, and positioning a rotation regulator that is configured to regulate a rotation movement of the rotor such that the rotation regulator is adjacent to the rotor in a direction of a rotation axis of the rotor.

Specifically, the present disclosure is directed to a spot welding electrode housing apparatus for housing an electrode for use in spot welding in such a manner that the electrode is mountable on an end of a shank of a welding gun, and provides the following solution.

According to a first aspect of the invention, the apparatus includes: a rotor including a plurality of recesses opening in a same direction around a rotation axis and a hollow portion therein, each of the recesses receiving a corresponding one of the electrodes inserted therein from a distal end thereof and housing and holding the corresponding one of the electrodes such that a base end of the corresponding one of the electrodes mounted on the shank partially juts out of an opening of each of the recesses; a biasing member housed in the hollow portion, and configured to rotationally bias the rotor toward one direction around the rotation axis; and a rotation regulator positioned adjacent to the rotor in a direction of the rotation axis, and configured to allow the rotor to abut against a side surface of the base end of one of the electrodes mounted on the shank and housed and held in a corresponding one of the recesses and thereby to regulate a rotation of the rotor toward the one direction around the rotation axis when the rotor is allowed to rotate toward the other direction around the rotation axis against a biasing force of the biasing member.

According to a second aspect of the invention, in the first aspect of the invention, a flexible ring member is attached to an inner circumferential surface of each of the recesses to fully contact an outer circumferential surface of each of the electrodes inserted into each of the recesses.

According to a third aspect of the invention, in the first or the second aspect of the invention, the recesses include a plurality of first recesses opening onto one side of the rotor in the direction of the rotation axis, and provided around the rotation axis, and a plurality of second recesses opening onto the other side of the rotor in the direction of the rotation axis, and provided around the rotation axis, and a corresponding one of the first recesses and a corresponding one of the second recesses are symmetrical along the direction of the rotation axis.

According to a fourth aspect of the invention, in the first aspect of the invention, the rotation regulator has a portion in the one direction around the rotation axis and an anti-interference portion having a step in the other direction around the rotation axis such that a surface of the anti-interference portion opposite to the rotor is closer to the rotor than a surface of the portion opposite to the rotor is, and the anti-interference portion is configured to avoid an interference with the end of the shank when one of the electrodes is mounted on the end of the shank.

In the first aspect of the invention, when the electrode against which the rotation regulator abuts is mounted on the end of the shank and is taken out of the corresponding recess, the rotation regulator cannot regulate the rotation of the rotor by the biasing member, and therefore, the rotor rotates toward the one direction around the rotation axis. Then, the rotation regulator abuts against the side surface of the base end of the succeeding electrode mountable on the shank and housed and held in the succeeding recess adjacent to the recess out of which the preceding electrode has been taken to stop the rotation of the rotor to allow the succeeding electrode to be positioned such that the electrode is mountable on the end of the shank. In this way, only taking an electrode out of a recess automatically allows the rotor to move until a succeeding electrode is positioned such that the electrode is mountable on the end of the shank. Therefore, it is unnecessary for the welding gun, as disclosed in Japanese Unexamined Patent Publication No. 2010-172913, to rotate the rotor, and the operation of mounting the electrode by the welding gun is less likely to affect a line takt time. The biasing member rotating the rotor is provided inside the rotor, and the rotation regulator regulating the rotation of the rotor is provided along the direction of the rotation axis of the rotor. Therefore, a sliding mechanism as disclosed in Japanese Unexamined Patent Publication No. 2010-172913 is not provided outside the outer circumference of the rotor, and the apparatus has a reduced size in the direction orthogonal to the direction of the rotation axis of the rotor.

In the second aspect of the invention, the electrode housed in the recess is held in the entire circumference around the central axis of the electrode, and therefore, after the electrode is taken out of the recess, when the rotation regulator contacts a succeeding electrode housed and held in an adjacent recess, the succeeding electrode can be prevented from being tilted inside the recess due to the biasing force of the biasing member. Therefore, the operation of mounting the electrode on the end of the shank is not performed with the central axis of the electrode being tilted. When the electrode is mounted on the end of the shank, an unnecessary load is not applied to the end of the shank and the electrode, and the shank and the electrode are not damaged.

In the third aspect of the invention, shanks are simultaneously brought close to the rotor from both sides in the direction of the rotation axis to be able to mount respective electrodes on the respective shanks to be able to efficiently mount the electrodes on a C type or X type welding gun.

In the fourth aspect of the invention, when the electrode whose length is short and which has a small region jutting out of the opening of the recess when it is housed and held in the recess, even if the end of the shank is brought close to the electrode, the end of the shank does not contact the rotation regulator because of the anti-interference portion. Therefore, the electrode having a short length in the central axis can be housed and held. The portion of the rotation regulator formed in the one direction around the rotation axis has a larger thickness and a higher rigidity than that of anti-interference portion of the rotation regulator formed in the other direction around the rotation axis, and therefore, even if the rotor rotates to allow the electrode to contact the rotation regulator and an impact is applied to the rotation regulator due to the biasing force of the biasing member, the rotation regulator is not damaged and can reliably regulate succeeding rotations of the rotor.

DETAILED DESCRIPTION

An embodiment of the present disclosure will be described in detail hereinafter with reference to the drawings. The following explanations of a preferred embodiment are substantially mere examples.

Figure 1:
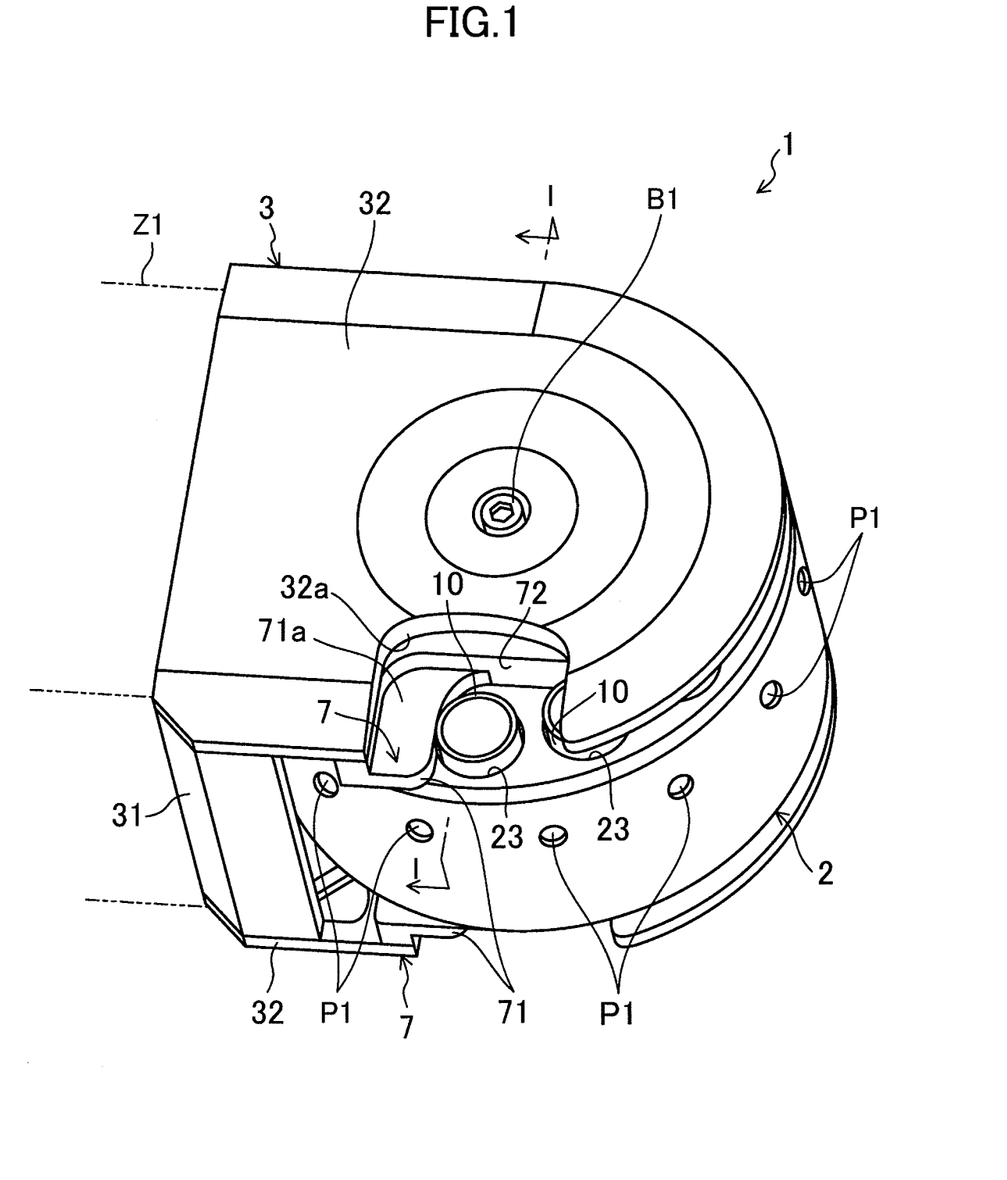
FIG. 1 is a perspective view of a spot welding electrode housing apparatus according to an embodiment of the present disclosure.

FIG. 1 is a perspective view of a spot welding electrode housing apparatus 1 according to the embodiment of the present disclosure. This electrode housing apparatus 1 is positioned at a side of a transfer path in an automobile production line, and stores an electrode 10 for spot welding which is positioned such that the electrode is mountable on an end of a shank S1 of a welding gun held by a welding robot (not shown) (see FIG. 4).

The electrode housing apparatus 1 is disc-shaped with a thickness, and includes a rotating plate 2 (rotor) whose rotation axis is in the vertical direction, and a support 3 rotatably supporting the rotating plate 2.

The support 3 includes a fixing plate 31 having a substantially strip-like shape, extending in the lateral direction, and fixed to other equipment Z1, and a pair of cover plates 32 parallely extending from the upper edge and the lower edge of the fixing plate 31 to be away from the equipment Z1, and facing each other with a space interposed therebetween, and the fixing plate 31 and the cover plates 32 form a substantially U shape when viewed from side.

The outer periphery of the edge of each of the cover plates 32 is curved to be semicircular-shaped, and the central portion of the upper cover plate 32 upwardly protrudes while the central portion of the lower cover plate 32 downwardly protrudes.

A notch 32a is formed at one side of each of the cover plates 32 in the lateral direction orthogonal to the extension direction of the cover plates 32 and has a substantially rectangular shape when viewed in plan.

Figure 2:
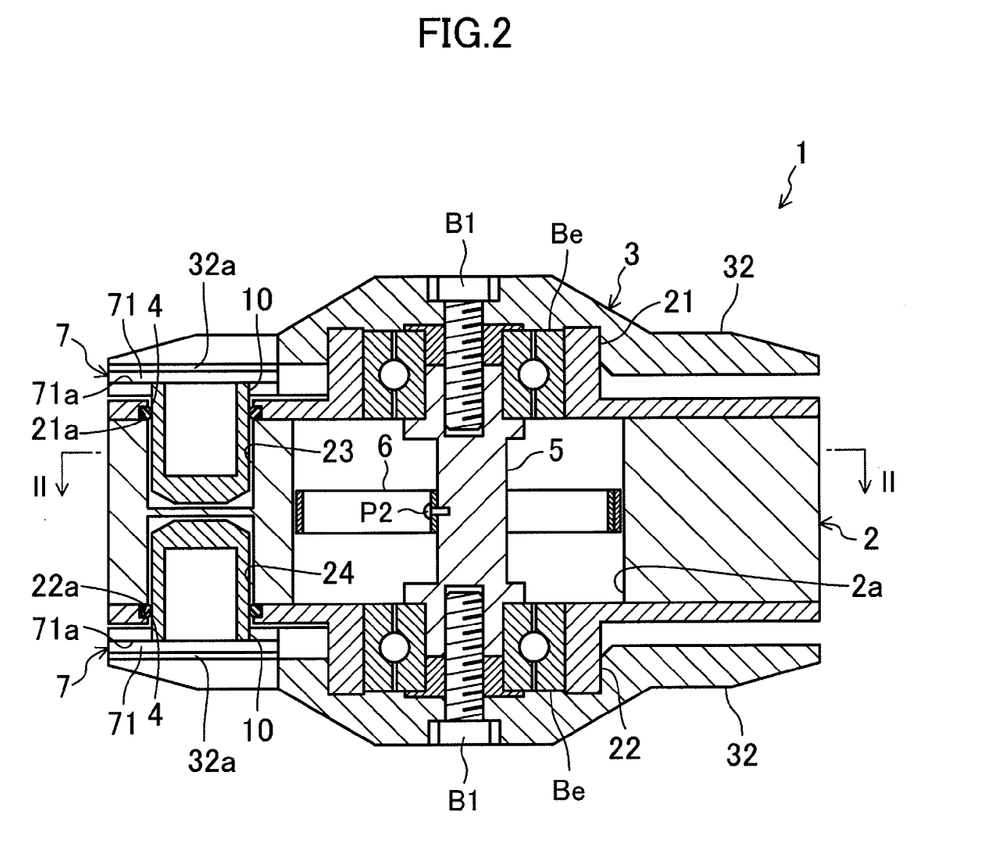
FIG. 2 is a cross sectional view taken along the line I-I of FIG. 1.

The rotating plate 2, as illustrated in FIG. 2, is positioned between both of the cover plates 32, and a hollow portion 2a opening in the vertical direction is formed inside the rotating plate 2.

An upper circular protrusion 21 is provided in the circumferential edge of the upper opening of the hollow portion 2a to upwardly protrude therefrom while a lower circular protrusion 22 is provided in the circumferential edge of the lower opening of hollow portion 2a to downwardly protrude therefrom.

A part of the upper surface of the rotating plate 2 is recessed to form twelve first recesses 23 opening upwardly (one side of the rotation axis) and provided around the rotation axis.

A part of the inner circumferential surface of the first recess 23 adjacent to the circumferential edge of the opening thereof is recessed to form a first circular recess 21a opening onto the inside of the first recess 23, and a flexible O ring 4 (ring member) made of rubber is fit into the first circular recess 21a.

In contrast, a part of the lower surface of the rotating plate 2 is recessed to form twelve second recesses 24 opening downwardly (the other side of the rotation axis) and provided around the rotation axis. The second recesses 24 and the first recesses 23 are vertically symmetrical (along the direction of the rotation axis).

A part of the inner circumferential surface of the second recess 24 adjacent to the circumferential edge of the opening thereof is recessed to form a second circular recess 22a opening onto the inside of the second recess 24, and a flexible O ring 4 is fit into the second circular recess 22a as well as in the first circular recess 21a.

When the respective electrodes 10 are inserted from the distal end thereof into the corresponding ones of the first and second recesses 23 and 24, each O ring 4 contacts the whole of the outer circumferential surface of a corresponding one of the electrodes 10.

The rotating plate 2 stores and holds the electrodes 10 such that a base end of each of the electrodes 10 mountable on the corresponding shank S1 partially juts out of the a first recess 23 or the second recess 24.

As illustrated in FIG. 1, a portion between adjacent ones of the first recesses 23 in the outer circumferential surface of the rotating plate 2 is filled with a pin P1 made of metal to enable to detect a rotation position of the rotating plate 2 by a metal detection sensor 8 positioned near the rotating plate 2 (see FIG. 3).

In the hollow portion 2a, as illustrated in FIG. 2, a vertically extending rotation shaft 5 is provided, and the upper end of the rotation shaft 5 is fixed to the central lower surface of the upper cover plate 32 by a bolt B1, and the lower end of the rotation shaft 5 is fixed to the central upper surface of the lower cover plate 32 by a bolt B1.

The upper portion and the lower portion of the rotation shaft 5 are respectively attached to the inside of the upper circular protrusion 21 and the inside of the lower circular protrusion 22 through bearings Be. With this configuration, the rotating plate 2 is allowed to rotate around the rotation shaft 5 (around the rotation axis).

Figure 3A:
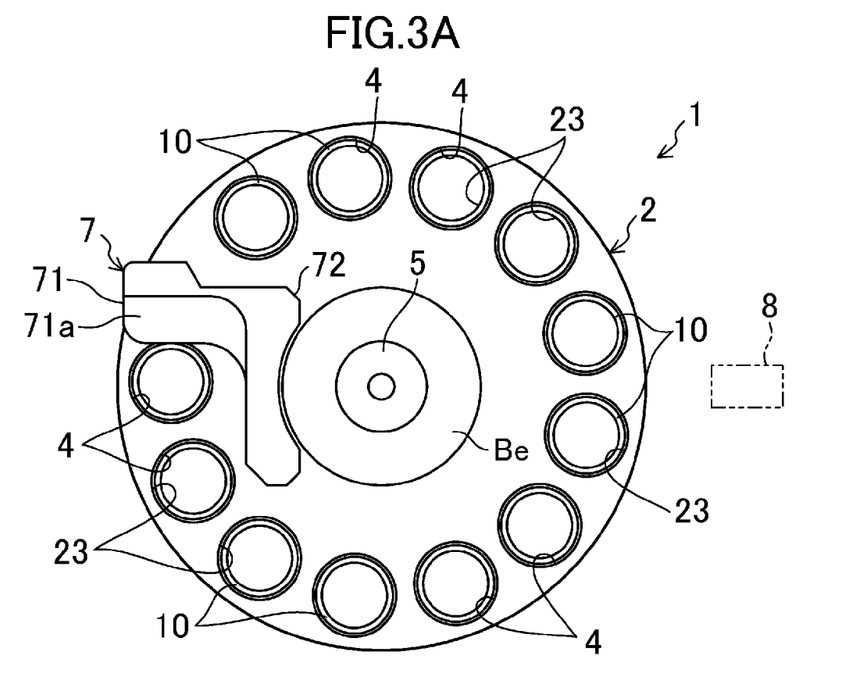
FIG. 3A is a plan view of the apparatus with an upper cover plate removed.
Figure 3B:
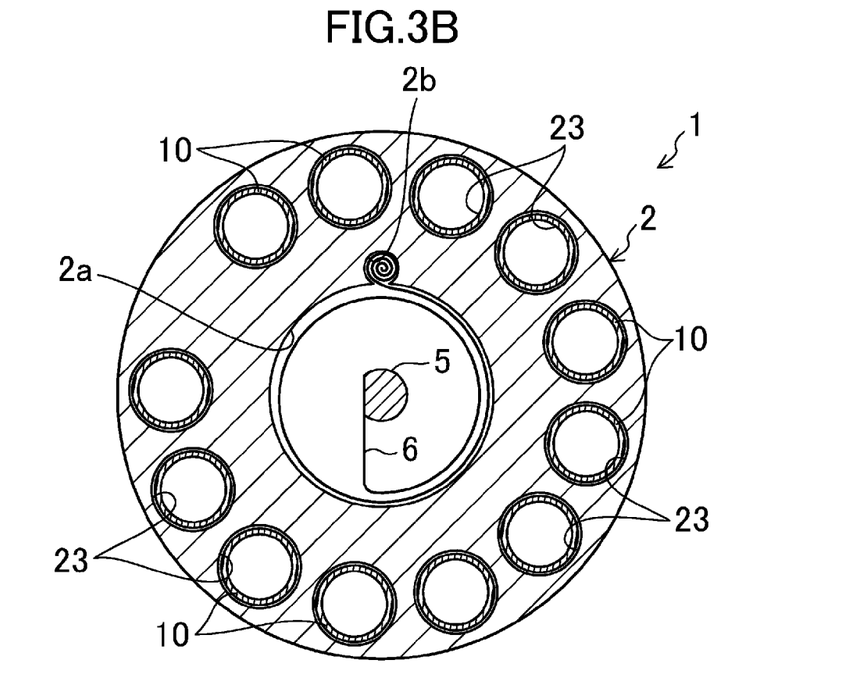
FIG. 3B is a cross sectional view taken along the line II-II of FIG. 2.

Furthermore, as illustrated in FIG. 3B, the hollow portion 2a stores a spiral spring 6 (biasing member) wound around the rotation shaft 5 when viewed in plan.

One end of the spiral spring 6 is fixed to the central portion of the rotation shaft 5 in the vertical direction by a pin P2 while the other end of the spiral spring 6, as illustrated in FIG. 3B, is fit into and fixed to a fitting recess 2b formed in the inner circumferential surface of the hollow portion 2a. The spiral spring 6 rotationally biases the rotating plate 2 toward one direction around the rotation axis (a clockwise direction when viewed in plan). The cross section of the spiral spring 6 is exaggeratedly illustrated in FIGS. 2 and 4.

As illustrated in FIG. 3A, a rotation regulator 7 is provided between each of the cover plates 32 and the rotating plate 2 and has a substantially L shape when viewed in plan. The rotation regulator 7 is fixed to each of the cover plate 32 and is positioned adjacent to the rotating plate 2 in the direction of the rotation axis.

Each rotation regulator 7 is composed of, as illustrated in FIGS. 1 and 3A, a first regulation portion 71 positioned along a part of the notch 32a adjacent to an edge of the equipment Z1, and a second regulation portion 72 positioned along a part of the edge of the notch 32a opposite to the opening of the notch 32a. The first regulation portion 71 has a portion in the one direction around the rotation axis and an anti-interference portion 71a having a step in the other direction around the rotation axis such that a surface of the anti-interference portion 71a opposite to the rotating plate 2 is closer to the rotating plate 2 than a surface of the portion opposite to the rotating plate 2 is, and the anti-interference portion 71a is configured to avoid an interference with the end of the shank S1 when the electrode 10 is mounted on the end of the shank S1.

The rotation regulator 7 (the first regulation portion 71) is configured to allow the rotating plate 2 to abut against a side surface of the base end of the electrode 10 mountable on the shank S1 and housed and held in the first recess 23 or the second recess 24 and thereby to regulate a rotation of the rotating plate 2 toward the one direction around the rotation axis (the clockwise direction when viewed in plan) when the rotating plate 2 is allowed to rotate toward the other direction around the rotation axis (in a counterclockwise direction when viewed in plan) against the biasing force of the spiral spring 6.

Next, a movement of the electrode housing apparatus 1 when the electrode 10 is mounted on the end of the shank S1 of the welding gun will be described.

First, before the operation of the production line, a worker inserts the electrodes 10 into the respective first and second recesses 23 and 24 from the distal end thereof through the notch 32a in series when each of the first and second recesses 23 and 24 traverses the notch 32a while allowing the rotating plate 2 to rotate toward the other direction around the rotation axis against the biasing force of the spiral spring 6.

After inserting the electrodes 10 into all of the first and second recess 23 and 24, the worker stops the rotation of the rotating plate 2 toward the other direction around the rotation axis. Due to the biasing force of the spiral spring 6, each of the electrodes 10 housed and held in the twelfth one of the first recess 23 or the second recess 24 abuts against the first regulation portion 71 of the rotation regulator 7 to stop the rotation of the rotating plate 2 toward the one direction around the rotation axis.

Subsequently, during the operation of the production line, if the electrode 10 mounted on the corresponding shank S1 of the welding gun (C type) is extremely depleted, an industrial robot (not shown) moves the welding gun to an electrode removal apparatus (not shown) and removes the electrode 10 mounted on the end of the shank S1, and then, moves the welding gun to the electrode housing apparatus 1 to associate the shank S1 with the corresponding notch 32a.

Figure 4:
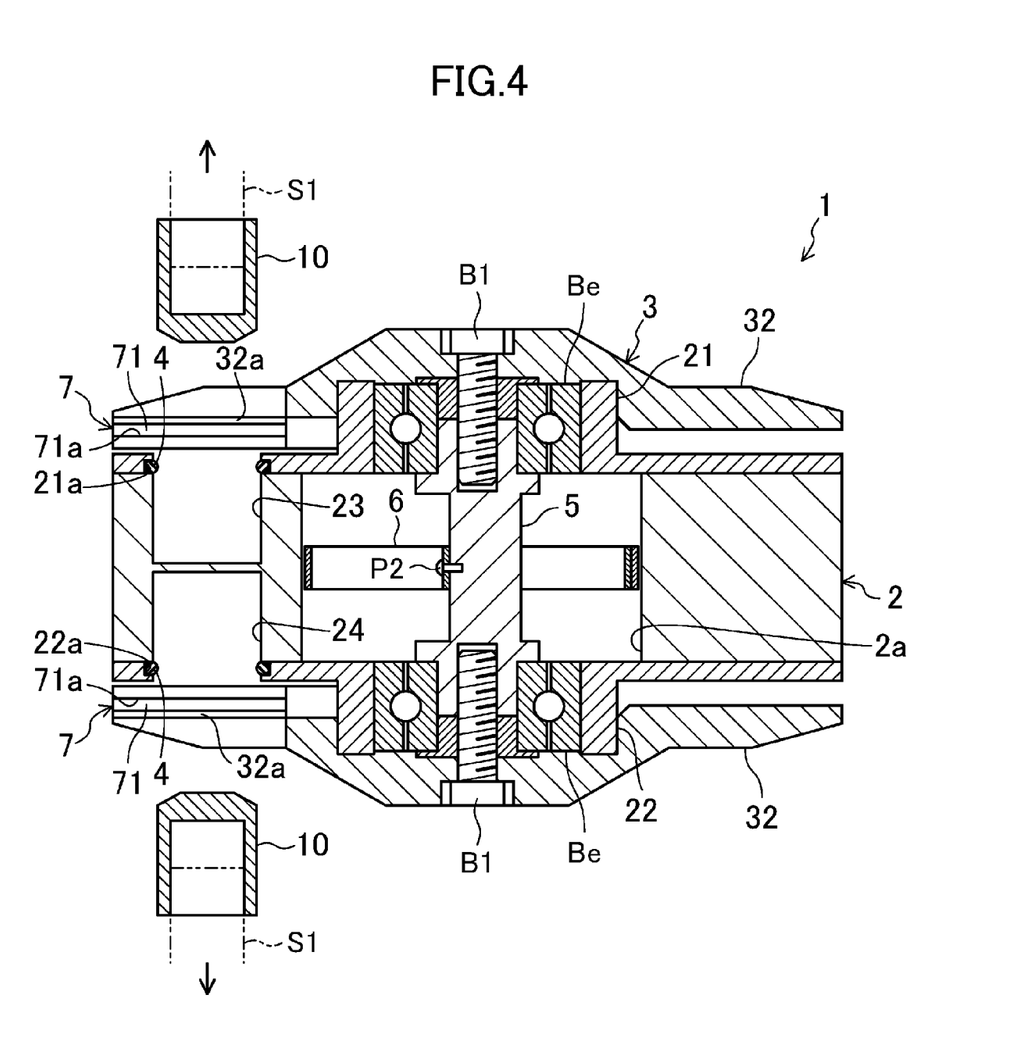
FIG. 4 is a view corresponding to FIG. 2 and illustrating a state immediately after an electrode is mounted on an end of a shank of a welding gun.

Each shank S1 is positioned to be adjacent to a succeeding electrode 10 housed and held in the first recess 23 or the second recess 24 to mount the electrode 10 on the end of the shank S1, and as illustrated in FIG. 4, the electrode 10 is taken out of the first recess 23 or the second recess 24.

Figure 5A:
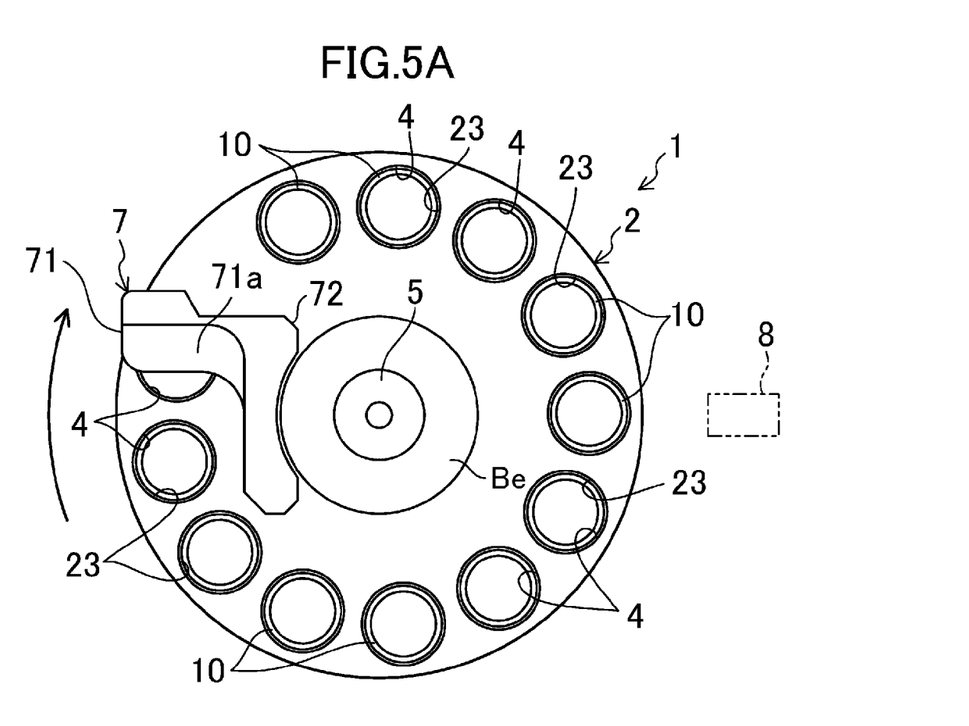
FIGS. 5A and 5B are views corresponding to FIGS. 3A and 3B and illustrating a state immediately after the electrode is mounted on the end of the shank of the welding gun, with FIG. 5A being a plan view of the apparatus with the upper plate removed, and FIG. 5B a cross sectional view taken along the line II-II of FIG. 2.
Figure 5B:
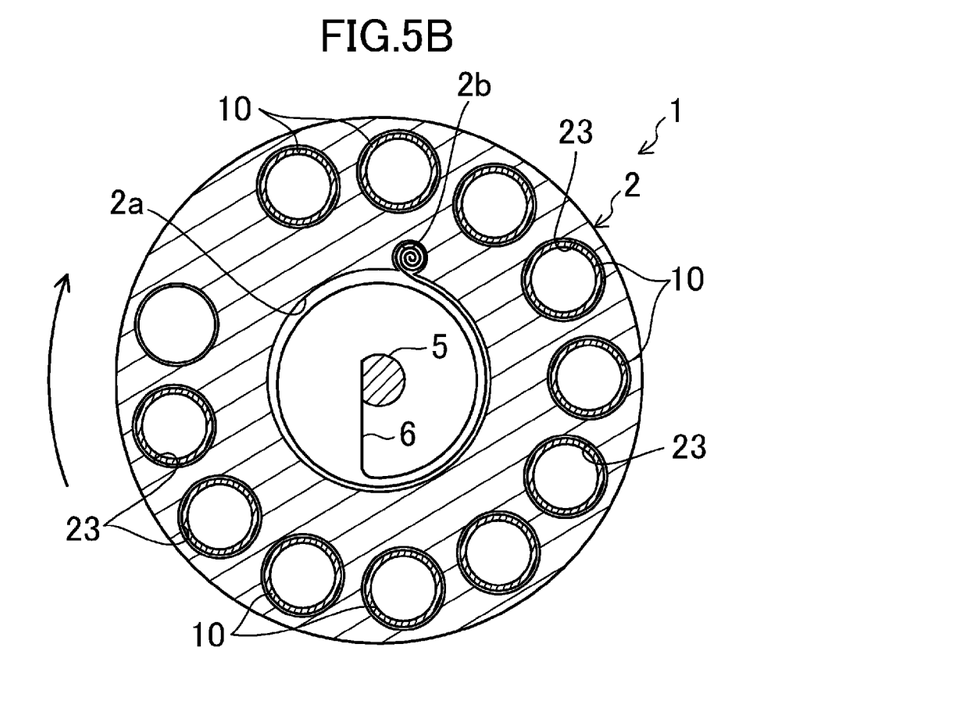
Figure 6A:
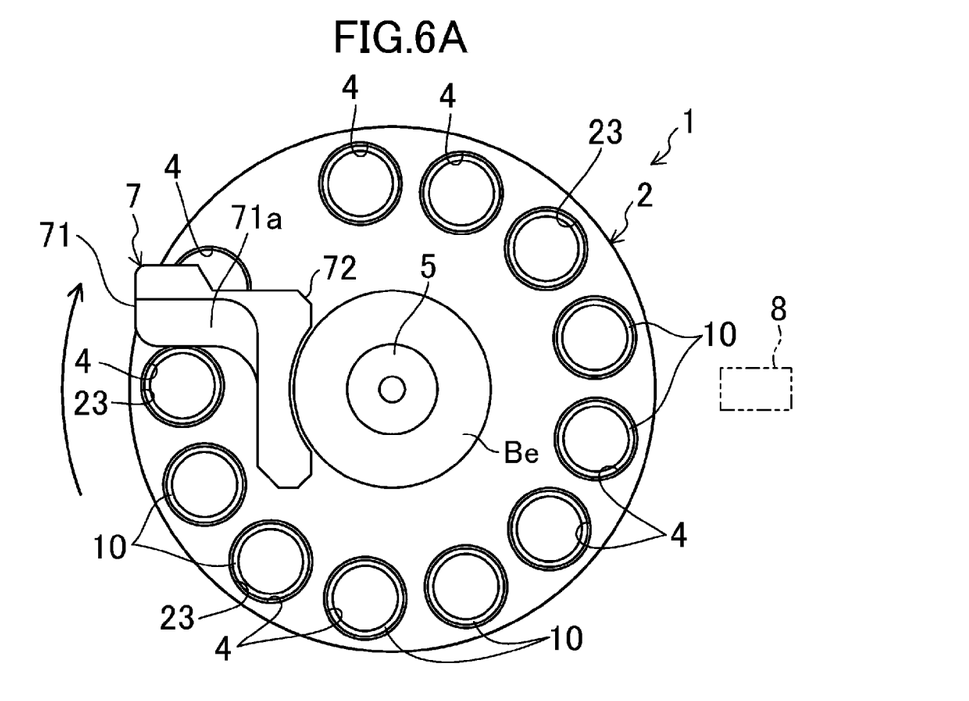
FIGS. 6A and 6B are views illustrating a state, after the state illustrated in FIGS. 5A and 5B, where a rotating plate further rotates to allow a succeeding electrode to be mountable, with FIG. 6A being a plan view of the apparatus with the upper plate removed, and FIG. 6B a cross sectional view taken along the line II-II of FIG. 2.
Figure 6B:
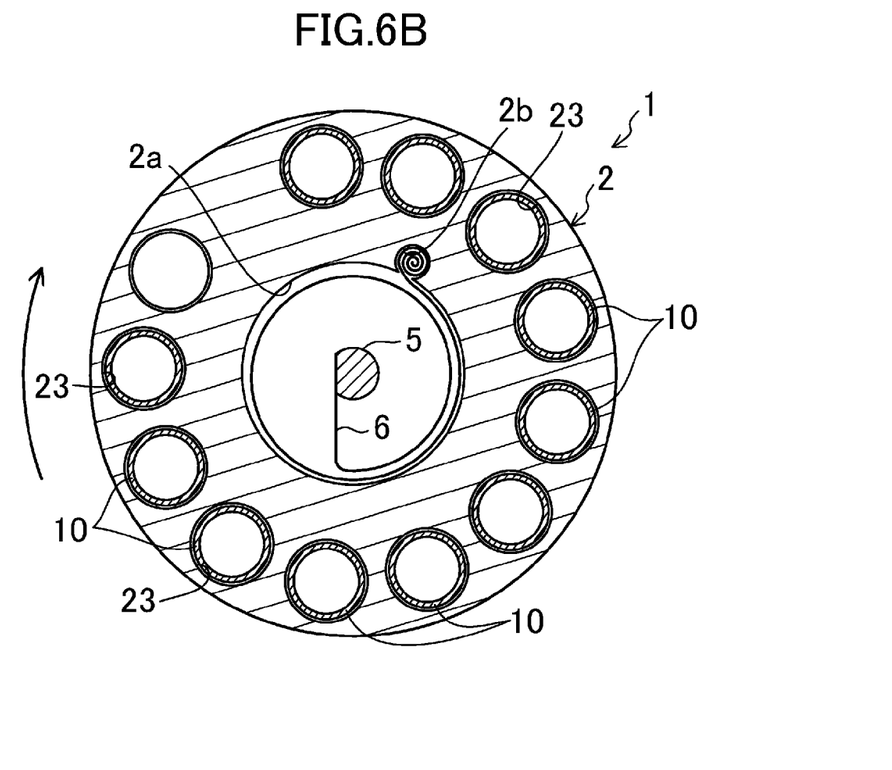

Then, the rotation regulator 7 cannot regulate the rotation of the rotating plate 2 due to the spiral spring 6, and therefore, as illustrated in FIGS. 5A and B, the rotating plate 2 rotates toward the one direction around the rotation axis. As illustrated in FIGS. 6A and 6B, the rotation regulator 7 abuts against a side of a base end of the succeeding electrode 10 mountable on the shank S1, and housed and held in a corresponding one of the first recess 23 or a corresponding one of the second recess 24 adjacent to the first recess 23 or the second recess 24 out of which the electrode 10 is taken to stop the rotation of the rotating plate 2 to allow the succeeding electrode 10 to be positioned such that the electrode is mountable on the end of the shank S1.

In this way, according to the embodiment of the present disclosure, only taking the electrodes 10 out of the corresponding first recess 23 and the corresponding second recess 24 automatically allows the rotating plate 2 to move until the succeeding electrode 10 is positioned to be mountable on the end of the shank S1. Therefore, it is unnecessary for the welding gun, as disclosed in Japanese Unexamined Patent Publication No. 2010-172913, to rotate the rotor, and the operation of mounting the electrode by the welding gun is less likely to affect a line takt time. The spiral spring 6 rotating the rotating plate 2 is provided inside the rotating plate 2, and the rotation regulator 7 regulating the rotation of the rotating plate 2 is provided in the direction of the rotation axis of the rotating plate 2. Therefore, a sliding mechanism as disclosed in Japanese Unexamined Patent Publication No. 2010-172913 is not provided outside the outer circumference of the rotating plate 2, and the electrode housing apparatus 1 has a reduced size in the direction orthogonal to the rotation axis direction of the rotating plate 2.

The O ring 4 allows the electrode 10 to be held in the entire circumference around the central axis of the electrode 10 while being housed in the first recess 23 or the second recess 24. Therefore, after the electrode 10 is taken out of the first recess 23 or the second recess 24, when the rotation regulator 7 contacts a succeeding electrode 10 housed and held in the adjacent first recess 23 or the adjacent second recess 24, the electrode 10 can be prevented from being tilted inside the first recess 23 or the second recess 24 due to the biasing force of the spiral spring 6. Therefore, the operation of mounting the electrode 10 on the end of the shank S1 is not performed with the central axis of the electrode 10 being tilted. When the electrode 10 is mounted on the end of the shank S1, an unnecessary load is not applied to the end of the shank S1 and the electrode 10, and the shank S1 and the electrode 10 are not damaged.

Furthermore, a part of the rotating plate 2 is recessed to form the first and second recesses 23 and 24 symmetrically provided along the direction of the rotation axis, and therefore, the shanks S1 are simultaneously brought close to the rotating plate 2 from both sides in the direction of the rotation axis to be able to mount the electrodes 10 into the respective shanks S1 to be able to efficiently mount the electrodes 10 on the C type or X type welding gun.

In addition, the anti-interference portion 71a is formed in the rotation regulator 7, when the electrode 10 whose length in the central axis is short and which has a small region jutting out of the opening of the first recess 23 or the second recess 24 when it is housed and held in the first recess 23 or the second recess 24 is mounted on the end of the shank S1 of the welding gun, even if the end of the shank S1 is brought close to the electrode 10, the end of the shank S1 does not contact the rotation regulator 7 because of the anti-interference portion 71a. Therefore, the electrodes 10 having a short length in the central axis can be housed and held in the respective first recesses 23 and the second recesses 24. The portion of the rotation portion 71 of the rotation regulator 7 formed in the one direction around the rotation axis has a larger thickness and a higher rigidity than that of the anti-interference portion 71a of the rotation portion 71 of the rotation regulator 7 formed in the other direction around the rotation axis, and therefore, even if the rotating plate 2 rotates to allow the electrode 10 to contact the rotation regulator 7 and an impact is applied to the rotation regulator 7 due to the biasing force of the spiral spring 6, the rotation regulator 7 is not damaged and can reliably regulate succeeding rotations of the rotating plate 2.

In the embodiment of the present disclosure, the first recesses 23 and the second recesses 24 are symmetrically provided in the rotating plate 2 along the direction of the rotation axis. The present disclosure is also applicable to another rotating plate 2 in which only the first recesses 23 are provided, and to another rotating plate 2 in which only the second recesses 24 are provided.

In the embodiment of the present disclosure, the first recesses 23 include twelve first recesses and the second recesses 24 includes twelve second recesses in the rotating plate 2. The rotating plate 2 may include another number of the first recesses 23 and another number of the second recesses 24.

Furthermore, in the embodiment of the present disclosure, the spiral spring 6 is used as a biasing member rotationally biasing the rotating plate 2. A coil spring, etc., may rotationally bias the rotating plate 2.

In addition, in the embodiment of the present disclosure, the rotation axis of the rotating plate 2 is in the vertical direction. The present disclosure is also applicable to another rotating plate 2 whose rotation axis is in another direction.

The present invention is suitable for a spot welding electrode housing apparatus housing spot welding electrodes used in, for example, automobile production lines such that the electrodes are mountable on a shank end of a welding gun.

What is claimed is:

1. A spot welding electrode housing apparatus for housing electrodes for use in spot welding in such a manner that each of the electrodes is mountable on an end of a shank of a welding gun, the apparatus comprising:
    a rotor including a plurality of recesses opening in a same direction around a rotation axis and a hollow portion therein, each of the recesses receiving a corresponding one of the electrodes inserted therein from a distal end thereof and housing and holding the corresponding one of the electrodes such that a base end of the corresponding one of the electrodes mounted on the shank partially juts out of an opening of each of the recesses;
    a biasing member housed in the hollow portion, and configured to rotationally bias the rotor toward one direction around the rotation axis; and
    a rotation regulator positioned adjacent to the rotor in a direction of the rotation axis, and configured to allow the rotor to abut against a side surface of the base end of one of the electrodes mounted on the shank and housed and held in a corresponding one of the recesses and thereby to regulate a rotation of the rotor toward the one direction around the rotation axis when the rotor is allowed to rotate toward the other direction around the rotation axis against a biasing force of the biasing member, wherein
    a portion between adjacent ones of the recesses in the outer circumstantial surface of the rotor is filled with a pin made of metal, and
    a metal detection sensor capable of detecting whether the pin has moved during rotation of the rotor is provided near the rotor.

2. The spot welding electrode housing apparatus of claim 1, wherein
    a flexible ring member is attached to an inner circumferential surface of each of the recesses to fully contact an outer circumferential surface of each of the electrodes inserted into each of the recesses.

3. The spot welding electrode housing apparatus of claim 1, wherein
    the recesses include a plurality of first recesses opening onto one side of the rotor in the direction of the rotation axis, and provided around the rotation axis, and a plurality of second recesses opening onto the other side of the rotor in the direction of the rotation axis, and provided around the rotation axis, and a corresponding one of the first recesses and a corresponding one of the second recesses are symmetrical along the direction of the rotation axis.

4. The spot welding electrode housing apparatus of claim 1, wherein the rotation regulator has a portion in the one direction around the rotation axis and an anti-interference portion having a step in the other direction around the rotation axis such that a surface of the anti-interference portion opposite to the rotor is closer to the rotor than a surface of the portion opposite to the rotor is, and the anti-interference portion is configured to avoid an interference with the end of the shank when one of the electrodes is mounted on the end of the shank.

5. The spot welding electrode housing apparatus of claim 2, wherein the recesses include a plurality of first recesses opening onto one side of the rotor in the direction of the rotation axis, and provided around the rotation axis, and a plurality of second recesses opening onto the other side of the rotor in the direction of the rotation axis, and provided around the rotation axis, and a corresponding one of the first recesses and a corresponding one of the second recesses are symmetrical along the direction of the rotation axis.

\* \* \* \* \*